United States Patent
A et al.

(10) Patent No.: US 10,897,395 B2
(45) Date of Patent: Jan. 19, 2021

(54) PROGRAMMABLE CONFIGLETS THROUGH OPAQUE INTENTS IN GRAPH BASED INTENT CONTROLLERS

(71) Applicant: Juniper Networks, Inc., Sunnyvale, CA (US)

(72) Inventors: Chandrasekhar A, Bangalore (IN); Anand Beedi, Fremont, CA (US); Javier Antich, Valencia (ES); Jayanthi R, Coimbatore (IN); Rahamath Sharif, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/551,532

(22) Filed: Aug. 26, 2019

(65) Prior Publication Data
US 2020/0403863 A1  Dec. 24, 2020

(30) Foreign Application Priority Data
Jun. 18, 2019  (EP) .................................. 19382504.9

(51) Int. Cl.
*G06F 15/177* (2006.01)
*H04L 12/24* (2006.01)
*G06F 16/901* (2019.01)

(52) U.S. Cl.
CPC ...... *H04L 41/0813* (2013.01); *G06F 16/9024* (2019.01)

(58) Field of Classification Search
None
See application file for complete search history.

(56) References Cited

U.S. PATENT DOCUMENTS

| 6,260,068 B1* | 7/2001 | Zalewski | G06F 9/5077 707/999.01 |
| 2002/0032850 A1* | 3/2002 | Kauffman | G06F 9/5077 712/31 |
| 2007/0067351 A1 | 3/2007 | Singh et al. | |

(Continued)

OTHER PUBLICATIONS

Extended Search Report from counterpart European Application No. 19382504.9, dated Oct. 11, 2019, 8 pp.

(Continued)

*Primary Examiner* — Phyllis A Book
(74) *Attorney, Agent, or Firm* — Shumaker & Sieffert, P.A.

(57) ABSTRACT

A controller device manages a plurality of network devices. The controller device is configured to receive, for a data structure, a configlet specifying a set of configuration changes to be applied to a resource of a plurality of resources of the plurality of network devices. A low level configuration for each respective owned resource of a set of owned resources of the plurality of resources includes a pointer indicating an owner for the respective owned resources. The one or more processing units are further configured to determine the set of configuration changes does not conflict in response to determining the low level configuration for the resource does not include a pointer indicating the owner for the resource is not the configlet and apply the set of configuration changes to the resource in response to determining the set of configuration changes does not conflict with the set of owned resources.

20 Claims, 10 Drawing Sheets

(56) References Cited

U.S. PATENT DOCUMENTS

2007/0189288 A1    8/2007    Andrews et al.
2016/0149760 A1    5/2016    Voit et al.

OTHER PUBLICATIONS

Harrington et al., "An Architecture for Describing Simple Network Management Protocol (SNMP) Management Frameworks," RFC 3411, Network Working Group, the Internet Engineering Task Force draft, Dec. 2002, 64 pp.
Enns, "Network Configuration Protocol (NETCONF)," Internet Engineering Task Force (IETF), RFC 6241, Jun. 2011, 114pp.
U.S. Appl. No. 15/462,465, filed Mar. 17, 2017, Juniper Networks, Inc. (inventor. A et al.), entitled "Configuring and Managing Network Devices Using Program Overlay on Yang-Based Graph Database".

* cited by examiner

PROGRAMMABLE CONFIGLETS THROUGH OPAQUE INTENTS IN GRAPH BASED INTENT CONTROLLERS

This application claims the benefit of EP Application No. EP19382504, filed Jun. 18, 2019, the entire contents of which are hereby incorporated by reference.

TECHNICAL FIELD

This disclosure relates to computer networks, and more particularly, to management of network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system allows administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across business computing architecture. For example, data models may be represented using data structures such as, for example, connected graphs having vertices connected with has-edges and reference (ref) edges. Controller devices may model intent data models as unified graphs. In this manner, business policies can be implemented across intent data models. When intents are modeled using a unified graph model, extending new intent support may extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to the device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators may include the translation or mapping logic from the high-level intent data model to the low-level device configuration model. In some instances, a relatively small number of changes in the intent data model may impact a relatively large number of properties across device configurations. Different translators may be used when services are created, updated, and deleted from the intent data model.

SUMMARY

In general, this disclosure describes techniques to support programmable configlets (e.g., a configuration profile that can be applied to one or more resources) through opaque intents in graph based intent controllers. A Network Management System (NMS) device, also referred to herein as a controller device, may configure network devices using low-level (that is, device-level) configuration data, e.g., expressed in Yet Another Next Generation (YANG) data modeling language. Moreover, the controller device may manage the network devices based on a combination of configlets and intents.

Techniques described herein may allow for the controller to automatically perform validations to help to ensure that there are no conflicts between different configlets and between configlets and intent-generated configurations. For example, rather than a configlet overriding an intent-generated configuration, the controller may identify a conflict and refrain from applying the configlet. In this way, intent-generated configurations may support configlets while ensuring that no conflicts exist between the configlet and intent-generated configurations.

In one example, a method includes receiving, by a controller device that manages a plurality of network devices and for a data structure, a configlet specifying a set of configuration changes to be applied to a resource of a plurality of resources of the plurality of network devices, the data structure including a plurality of nodes and a plurality of edges, each node of the plurality of nodes being representative of a respective network device of the plurality of network devices and the plurality of edges defining relationships between the plurality of nodes, wherein a low level configuration for each respective owned resource of a set of owned resources of the plurality of resources includes a pointer indicating an owner for the respective owned resources. The method further includes determining, by the controller device, the set of configuration changes does not conflict with the set of owned resources in response to determining the low level configuration for the resource does not include a pointer indicating the owner for the resource is not the configlet and applying, by the controller device, the set of configuration changes to the resource in response to determining the set of configuration changes does not conflict with the set of owned resources.

In another example, a controller device that manages a plurality of network devices, the controller device comprising one or more processing units implemented in circuitry and configured to: receive, for a data structure, a configlet specifying a set of configuration changes to be applied to a resource of a plurality of resources of the plurality of network devices, the data structure including a plurality of nodes and a plurality of edges, each node of the plurality of nodes being representative of a respective network device of the plurality of network devices and the plurality of edges defining relationships between the plurality of nodes, wherein a low level configuration for each respective owned resource of a set of owned resources of the plurality of resources includes a pointer indicating an owner for the respective owned resources. The one or more processing units are further configured to determine the set of configuration changes does not conflict with the set of owned resources in response to determining the low level configuration for the resource does not include a pointer indicating the owner for the resource is not the configlet and apply the set of configuration changes to the resource in response to determining the set of configuration changes does not conflict with the set of owned resources.

In another example, a computer-readable storage medium has stored thereon instructions that, when executed, cause a processor of a controller device that manages a plurality of network devices to receive, for a data structure, a configlet specifying a set of configuration changes to be applied to a resource of a plurality of resources of the plurality of network devices, the data structure including a plurality of nodes and a plurality of edges, each node of the plurality of nodes being representative of a respective network device of the plurality of network devices and the plurality of edges defining relationships between the plurality of nodes, wherein a low level configuration for each respective owned resource of a set of owned resources of the plurality of resources includes a pointer indicating an owner for the respective owned resources. The instructions further cause the process to determine the set of configuration changes does not conflict with the set of owned resources in response to determining the low level configuration for the resource does not include a pointer indicating the owner for the resource is not the configlet and apply the set of configuration changes to the resource in response to determining the set of configuration changes does not conflict with the set of owned resources.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and description.

DETAILED DESCRIPTION

Figure 1:
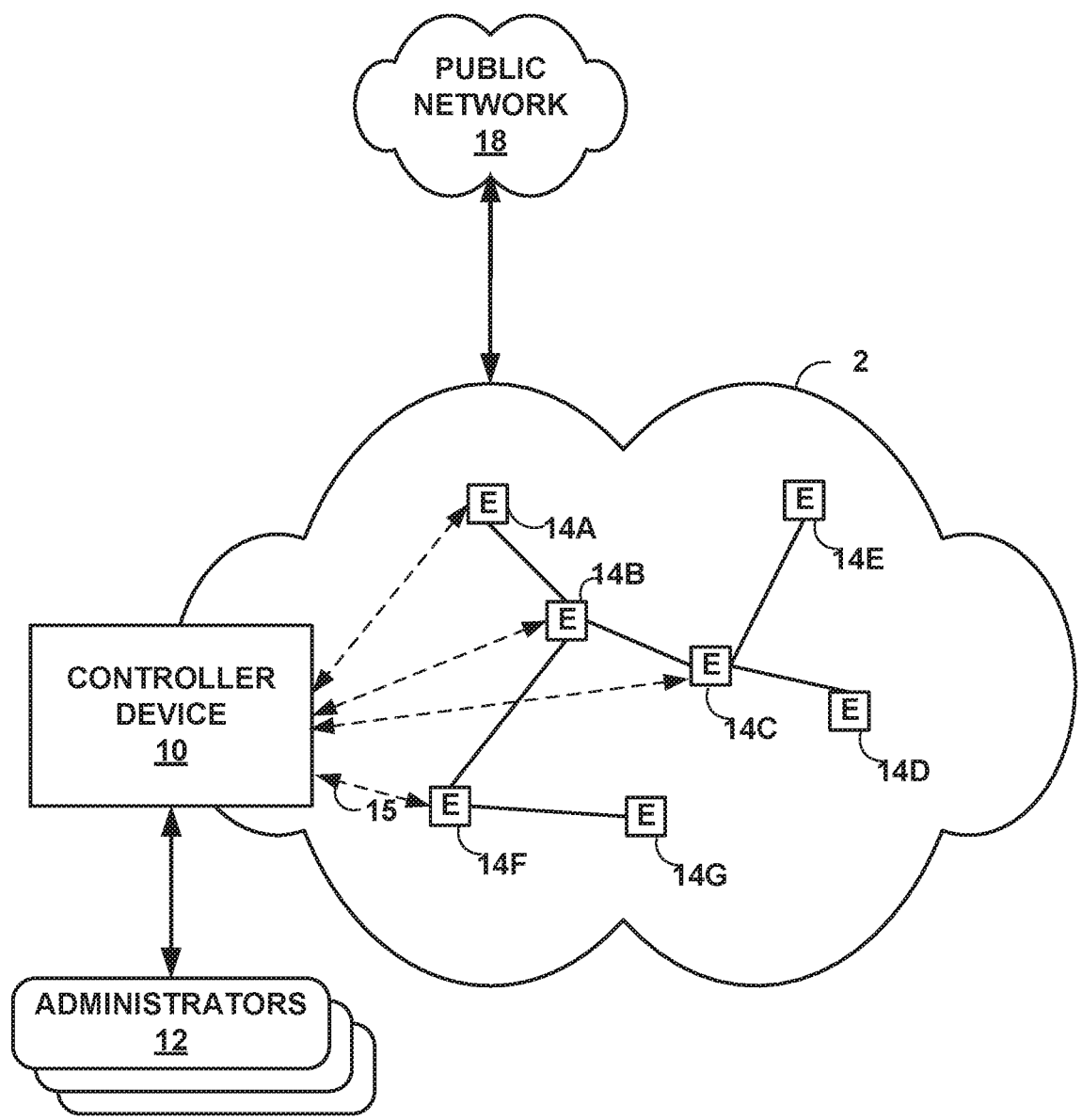
FIG. 1 is a block diagram illustrating an example including elements of an enterprise network that are upgraded using a management device.

This disclosure is directed to controllers supporting intent based workflows to manage the network. For example, a user (e.g., an administrator) may write translation programs that translate high-level configuration instructions (e.g., instructions according to an intent data model, which may be expressed as a unified graph model) to low-level configuration instructions (e.g., instructions according to a device configuration model) that can be applied to a resource of a network. As part of configuration service support, the user/administrator may provide the intent data model and a mapping between the intent data model to the device configuration model.

Such controllers may support configlets (e.g., a configuration profile that can be applied to one or more resources). For example, a configlet may represent a tool that directly applies a set of low-level configuration instructions to a set of resources of a network. For example, a user may apply configuration changes to multiple resources using a single configlet. As such, configlets may allow a user to quickly apply configurations, thus reducing complexity.

However, some systems may not support a full lifecycle of a configlet. For example, a system may not determine whether configlet changes, which may be considered as out-of-band changes, would conflict with previously applied configuration changes. In such instances, the system may not validate configlets. For example, if a user wants to configure port settings of a resource, the user may create port configlets and apply the port configlets on a managed network device. In this example, the user can create and apply one more configlets on the same port. Applying multiple configlets on the same port may cause a conflict between the configlets, which may result in incomplete or incompatible configurations.

Moreover, the system may have a device profile and a node profile that are each attached to (which is another way of stating that such profiles are associated with) the managed device. The attached device profile and node profile may not be attached to resources (e.g., controller managed and unmanaged). In such systems, there may be no way to detect the conflicts across profiles, which may be referred to herein as opaque intent graph model.

In accordance with techniques described herein, configlets may support intent based systems for customizing the intents and/or for supporting element and network functionality which may not be supported through intent workflows. For example, techniques described herein provide a programmatic way to model configlets in a managed network and perform validations with respect to the configlets so as to reduce (and possibly eliminate) conflicts that may result in malfunctioning intents. In some examples, configlets can be assigned on any resource. Examples of resources may include, but is not limited to, for example, a device, a port, a zone, a virtual network (van), a routing instance, a configuration resource object, or another resource. In some examples, the resources can be managed by a controller device or unmanaged. For instance, the resources can be managed within a controller device or the resources can be any path in configuration, which is directly present on device. In some examples, a controller device may be configured to permit configlets to co-exist with intents. For instance, a controller device may be configured to validate configlets, thereby potentially ensuring the configlet does not override an intent generated configuration. Techniques described herein may also permit a controller device to augment the configuration through configlets. In some examples, a controller device may apply configlets to manage any configuration. In some examples, a controller device may be configured to detect conflicts across configlets and/or intents.

Moreover, the controller device may be configured to apply configlets to any tag associated with resources. The controller device may be configured to model resources or the resources can be directly fetched from a device database on-demand. The controller device may be configured to tag resources on devices (e.g., elements). In this way, a configlet may be easily applied multiple resources.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Another example device protocol may include NETCONF, however, techniques described herein may be used with other device protocols. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Another example device protocol may include NETCONF, however, techniques described herein may be used with other device protocols. Further details of the NETCONF protocol can be found in Enns et al., RFC 6241, "Network Configuration Protocol (NETCONF)," Network Working Group, the Internet Engineering Task Force draft, June 2011, available at https://tools.ietf.org/html/rfc6241, the entire contents of which are incorporated herein by reference.

In common practice, controller device 10, also referred to as a network management system (NMS) or NMS device, and elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/htm/rfc4741. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG-A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data changes, e.g., device configuration additions and removals. That is, $y_1=f_1(x)$, $y_2=f_2(x)$, ... $y_N=f_N(x)$.

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

Controller device 10 may be configured to support configlets, which may allow administrators 12 to quickly apply a set of low-level configuration changes to elements 14. Moreover, controller device 10 may be configured to support intent-based configurations, which may allow administrators 12 to provide a stateless intent that controller device 10 converts into a set of low-level configuration changes to elements 14. However, in some examples, administrators 12 may request controller device 10 to apply a configlet that would apply a set of low-level configuration changes to elements 14 that conflict with low-level configuration changes previously applied to satisfy a stateless intent. In such instances, applying the configlet may result in controller device 10 failing to satisfy the stateless intent. For instance, when administrators 12 request a particular bandwidth between element 14A and element 14D, controller device 10 may fail to provide the particular bandwidth after applying a configlet that applies low-level configuration changes to elements 14.

Generally, techniques described herein may permit use of configlets (e.g., a configuration profile that can be applied one or more resources) while supporting intent based systems for customizing the intents. For example, controller device 10 may be configured to receive, for a data structure, a configlet specifying a set of configuration changes to be applied to a resource of elements 14. For instance, administrator 12 may be configured to receive a configlet from administrators 12 that specifies a set of configuration changes (e.g., a Virtual Private Network (VPN) connection, a Label-Switched Path (LSP) connection, etc.) to be applied to a resource (e.g., element 14A) of elements 14.

In some examples, a low level configuration for each respective owned resource of a set of owned resources of the plurality of resources includes a pointer indicating an owner for the respective owned resources of elements 14. For example, controller device 10 may have generated low level configuration for a set of owned resources of elements 14 based on an intent-generated configuration (e.g., using an intent provided by administrators 12). In this example, controller device 10 may have modified the low level configuration to include a pointer indicating the owner for the set of owned resources is the intent-generated configuration. In another example, controller device 10 may have generated low level configuration for a set of owned resources based on a previously applied configlet. In this example, controller device 10 may have modified the low level configuration to include a pointer indicating the owner for the set of owned resources is the previously applied configlet.

Controller device 10 may be configured to determine the set of configuration changes does not conflict with the set of owned resources in response to determining the low level configuration does not include a pointer indicating the owner for the resource is not the configlet. For example, controller device 10 may be configured to determine the set of configuration changes does not conflict with the set of owned resources in response to determining the set of configurations changes does not change a resource controlled or owned by an intent-generated configuration or a previously applied configlet.

Controller device 10 may be configured to apply the set of configuration changes to the resource in response to determining the set of configuration changes does not conflict with the set of owned resources. For example, controller device 10 may apply the set of configuration changes in response to determining the set of configurations changes does not change a resource controlled or owned by an intent-generated configuration or a previously applied configlet. In response, however, to determining the set of configurations changes a resource controlled or owned by an intent-generated configuration or a previously applied configlet, controller device 10 may be configured to refrain from applying the set of configuration changes. In some examples, controller device 10 may be configured to provide an alert to administrators 12 in response to determining the set of configurations changes a resource controlled or owned by an intent-generated configuration or a previously applied configlet. In this way, controller device 10 may be configured to permit use of configlets while supporting intent based systems for customizing the intents.

To process configlets, controller device 10 may be configured to apply configuration changes to resources of elements 14 that may conflict with previously applied intent-generated configurations, which may result in elements 14 being configured in erroneous states. Configuring elements 14 with erroneous states may result in elements 14 working slower or with fewer connections (resulting in less redundancy and less reliability) between elements 14. Moreover, applying configurations changes to resources of elements 14 that conflict with previously applied intent-generated configurations may result in controller device 10 failing to satisfy the intent of the intent-generated configurations, thereby resulting in user frustration.

To help to ensure that applying configlets does not result in conflicts with previously applied intent-generated configurations or previously applied configlets, controller device 10 may be configured to perform validations with respect to the configlets so as to reduce (and possibly eliminate) conflicts that may result in malfunctioning intents. For instance, controller device 10 may be configured to determine the set of configuration changes does not conflict with the set of owned resources in response to determining the low level configuration does not include a pointer indicating the owner for the resource is not the configlet and apply the set of configuration changes to the resource in response to determining the set of configuration changes does not conflict with the set of owned resources. Configuring controller device 10 to determine the set of configuration changes does not conflict with the set of owned resources in response to determining the low level configuration does not include a pointer indicating the owner for the resource may help to prevent configlets from conflicting with previously applied intent-generated configurations and previously applied configlets, which may help to prevent elements 14 from being configured in erroneous states, thereby improving an operation of controller device 10.

Figure 2:
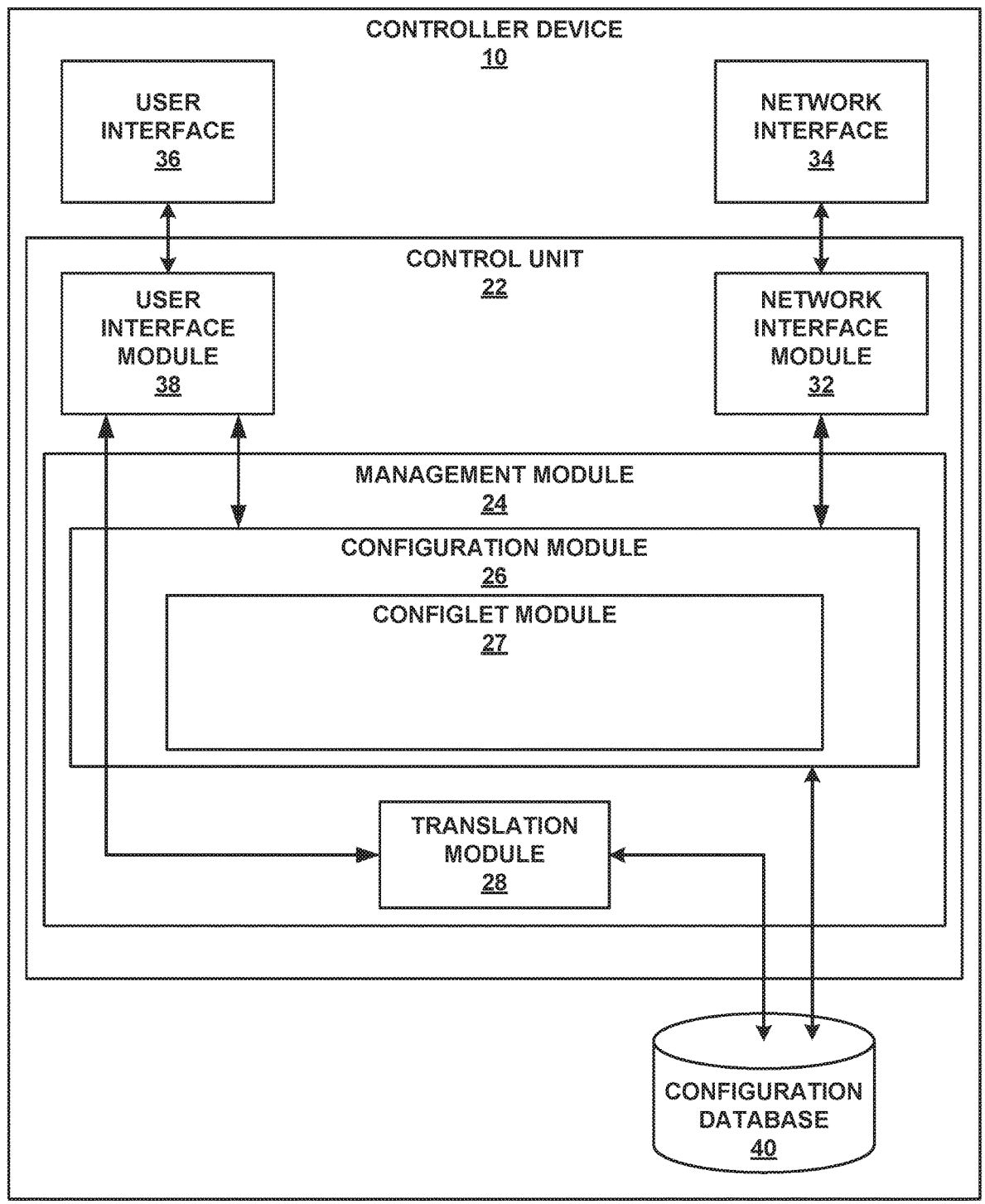
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management of a network device includes, for example, configuring the network devices according to instructions received from a user (e.g., administrators 12 of FIG. 1) and providing the user with the ability to submit instructions to configure the network devices. Management of a network device further includes upgrading the network device with updated software, such as an updated software image. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 may include a data structure describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., elements 14). Configuration database 40 may include a database that comprises a unified intent data model. In some examples, configuration database 40 may store a low level configuration that includes, for each respective owned resource of a set of owned resources, a pointer indicating an owner for the respective owned resources of elements 14.

Configlet module 27 may be configured to determine the set of configuration changes does not conflict with the set of owned resources in response to determining the low level configuration does not include a pointer indicating the owner for the resource is not the configlet. For example, configlet module 27 may be configured to determine the set of configuration changes does not conflict with the set of owned resources in response to determining, with configuration database 40, the set of configurations changes does not change a resource controlled or owned by an intent-generated configuration or a previously applied configlet.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github-.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

Configlet module 27 may be configured to receive, for a data structure, a configlet specifying a set of configuration changes to be applied to a resource of elements 14. For instance, user interface 36 may receive a configlet from administrators 12 that specifies a set of configuration changes (e.g., a Virtual Private Network (VPN) connection, a Label-Switched Path (LSP) connection, etc.) to be applied to a resource (e.g., element 14A) of elements 14.

In some examples, configuration database 40 may store, for each respective owned resource of a set of owned resources, a low level configuration that includes a pointer indicating an owner for the respective owned resources of elements 14. For example, configlet module 27 may have generated low level configuration for a set of owned resources of elements 14 based on an intent-generated configuration (e.g., using an intent received by user interface 36). For instance, translation module 28 executes to transform an intent data model that for the intent received by user interface 36 to device-specific, low-level configuration instructions that include a pointer indicating the owner for the set of owned resources is the intent-generated configuration. In another example, configlet module 27 may have generated low level configuration for a set of owned resources in response to user interface 36 receiving a configlet. In this example, configlet module 27 may have modified the low level configuration of a data structure to include a pointer indicating the owner for the set of owned resources is the previously applied configlet.

Configlet module 27 may be configured to determine the set of configuration changes does not conflict with the set of owned resources in response to determining the low level configuration does not include a pointer indicating the owner for the resource is not the configlet. For example, configlet module 27 may be configured to determine the set of configuration changes does not conflict with the set of owned resources in response to determining, with configuration database 40, the set of configurations changes does not change a resource controlled or owned by an intent-generated configuration or a previously applied configlet.

Configlet module 27 may be configured to apply the set of configuration changes to the resource in response to determining the set of configuration changes does not conflict with the set of owned resources. For example, configlet module 27 may apply the set of configuration changes to elements 14 in response to determining the set of configurations changes does not change a resource controlled or owned by an intent-generated configuration or a previously applied configlet. In some examples, configlet module 27 may be configured to update a data structure stored by configuration database 40 to represent that the set of configurations changes has been applied to the resources of elements 14. In response, however, to determining the set of configurations changes a resource controlled or owned by an intent-generated configuration or a previously applied configlet, configlet module 27 may be configured to refrain from applying the set of configuration changes. In some examples, configlet module 27 may be configured to provide an alert to via user interface 36 in response to determining the set of configurations changes a resource controlled or owned by an intent-generated configuration or a previously applied configlet. In this way, configlet module 27 may be configured to permit use of configlets while supporting intent based systems for customizing the intents.

Figure 3:
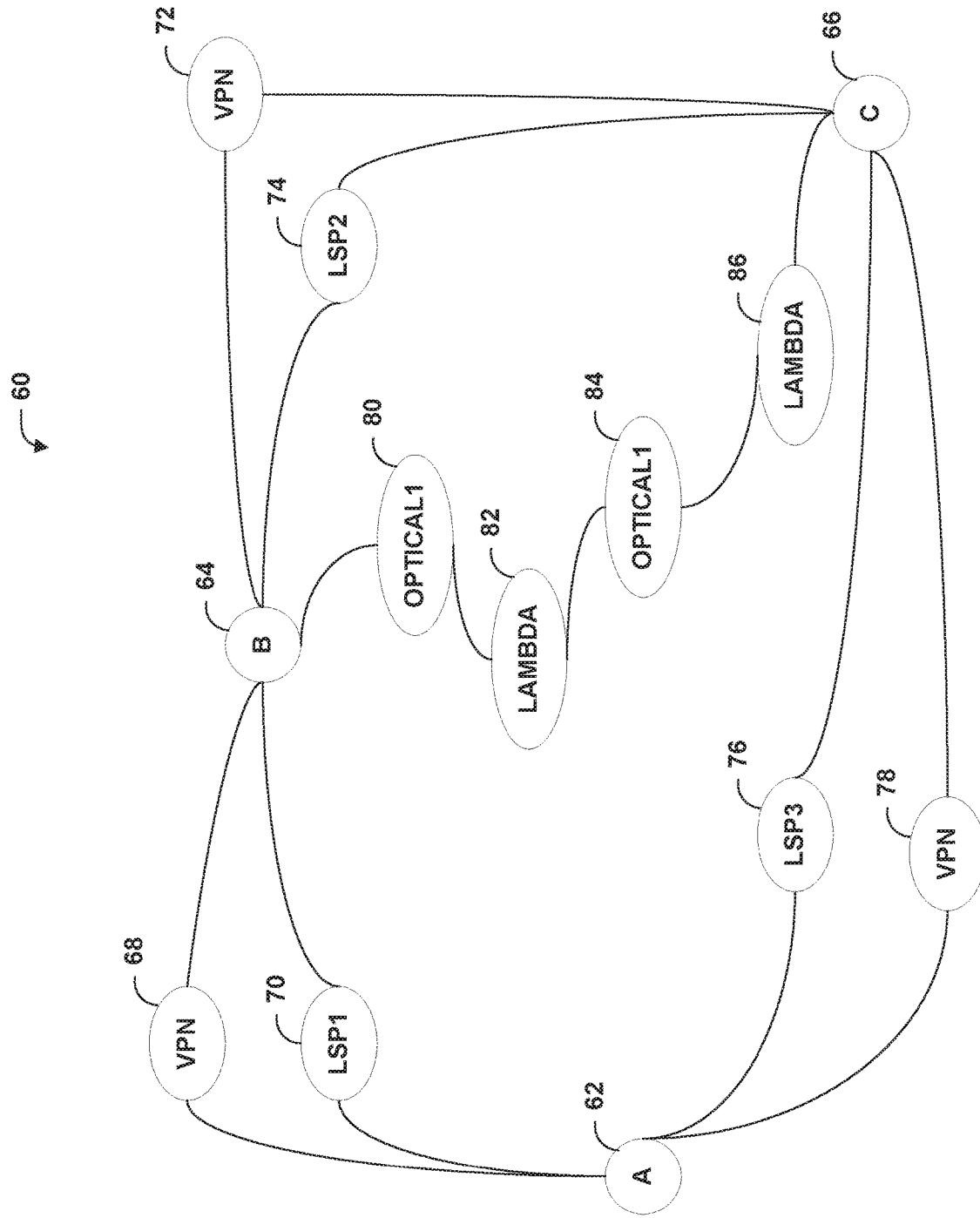
FIG. 3 is a conceptual diagram illustrating an example unified graph model for an intent data model.

FIG. 3 is a conceptual diagram illustrating an example unified graph model 60 for an intent data model. The process illustrated in FIG. 3 may represent an example of how controller device 10 may generate an intent-generated configuration. Unified graph model 60 may be an example of a data structure stored by configuration database 40 of FIG. 2. Unified graph model 60, in this example, includes nodes A 62, B 64, and C 66, among others, which may represent respective network devices (e.g., elements 14). As shown, unified graph model 60 may include edges defining relationships between the plurality of nodes A 62, B 64, and C 66. For instance, edges connecting node B 64 and node C 66 via LSP2 may define an RSVP LSP between node B 64 and node C 66.

Initially, unified graph model 60 may not include VPN 68, VPN 72, and VPN 78, nor optical1 80, lambda 82, optical1 84, and lambda 86. As a result of modifications through intent data model updates, node A 62 is coupled to node B 64 via VPN 68 and LSP1 70, node B 64 is coupled to node C 66 via VPN 72 and LSP2 74, and node C 66 is coupled to node A 62 via VPN 78 and LPS3 76. Furthermore, as a result of additional capacity being required as an optical intent, additional nodes optical1 80, lambda 82, optical1 84, and lambda 86 are added between node B 64 and node C 66.

Stateful business policies can be written on top of a stateless intent layer. For example, a user may state the intent "provide high bandwidth VPN connectivity between sites A, B, and C with bandwidth between A-B, B-C, C-A, . . ." This may lead to various stateless intents. The stateful intent may be compiled into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP-LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. applicant Ser. No. 15/462, 465, filed Mar. 17, 2017, which is incorporated by reference in its entirety. Thus, intent data models can be represented using unified graph models. When more use cases are added, the intent data model (i.e., the unified graph model) can be extended. Also, use of unified graph models allows for retrieval of intents based on endpoints (e.g., by querying the graph).

However, even when accounting for existing stateless intents, a controller device may apply configlets that cause the controller device to no longer realize stateful intents, which would result in the controller device failing to maintain intent-generated configurations. For example, controller device 10 may be configured to receive, for a data structure, a configlet specifying a set of configuration changes to be applied to node B 64 and node C66. For instance, receive a configlet that specifies a set of configuration changes to LSP2 74 that reduces the bandwidth from 50 Mbps to 30 Mbps. In this example, applying the configlet causes the controller device to no longer configure elements 14 to realize an RSVP LSP between B-C with 50 Mbps, which may result in controller device failing to satisfy the stateful intent for a particular bandwidth between node A 62 and node C 66.

In accordance with techniques described herein, controller device 10 may be configured to include, for each respective owned resource of a set of owned resources, a pointer indicating an owner for the respective owned resources of elements 14. For example, controller device 10 may generate low level configuration for a set of owned resources of elements 14 based on the intent-generated configuration represented by unified graph model 60. In this example, controller device 10 may modified the low level configuration to include a pointer indicating the owner for the set of owned resources is the intent-generated configuration.

In this example, controller device 10 may be configured to determine the set of configuration changes does not conflict with the set of owned resources in response to determining the low level configuration does not include a pointer indicating the owner for the resource is not the configlet. For example, controller device 10 may be configured to determine the set of configuration changes does not conflict with the set of owned resources in response to determining the set of configurations changes does not change a resource controlled or owned by an intent-generated configuration or a previously applied configlet. For instance, controller device 10 may be configured to determine the set of configuration changes does not conflict with the set of owned resources in response to determining that the low level configuration for the resource does not include the pointer indicating the owner for the resource. In some instances, controller device 10 may be configured to determine the set of configuration changes does not conflict with the set of owned resources in response to determining that the low level configuration for the resource includes the pointer indicating the owner for the resource and the pointer indicates the owner is the configlet.

Controller device 10 may be configured to apply the set of configuration changes to the resource in response to determining the set of configuration changes does not conflict with the set of owned resources. For example, controller device 10 may apply the set of configuration changes in response to determining the set of configurations changes does not change a resource controlled or owned by the intent-generated configuration represented by unified graph model 60.

Figure 4:
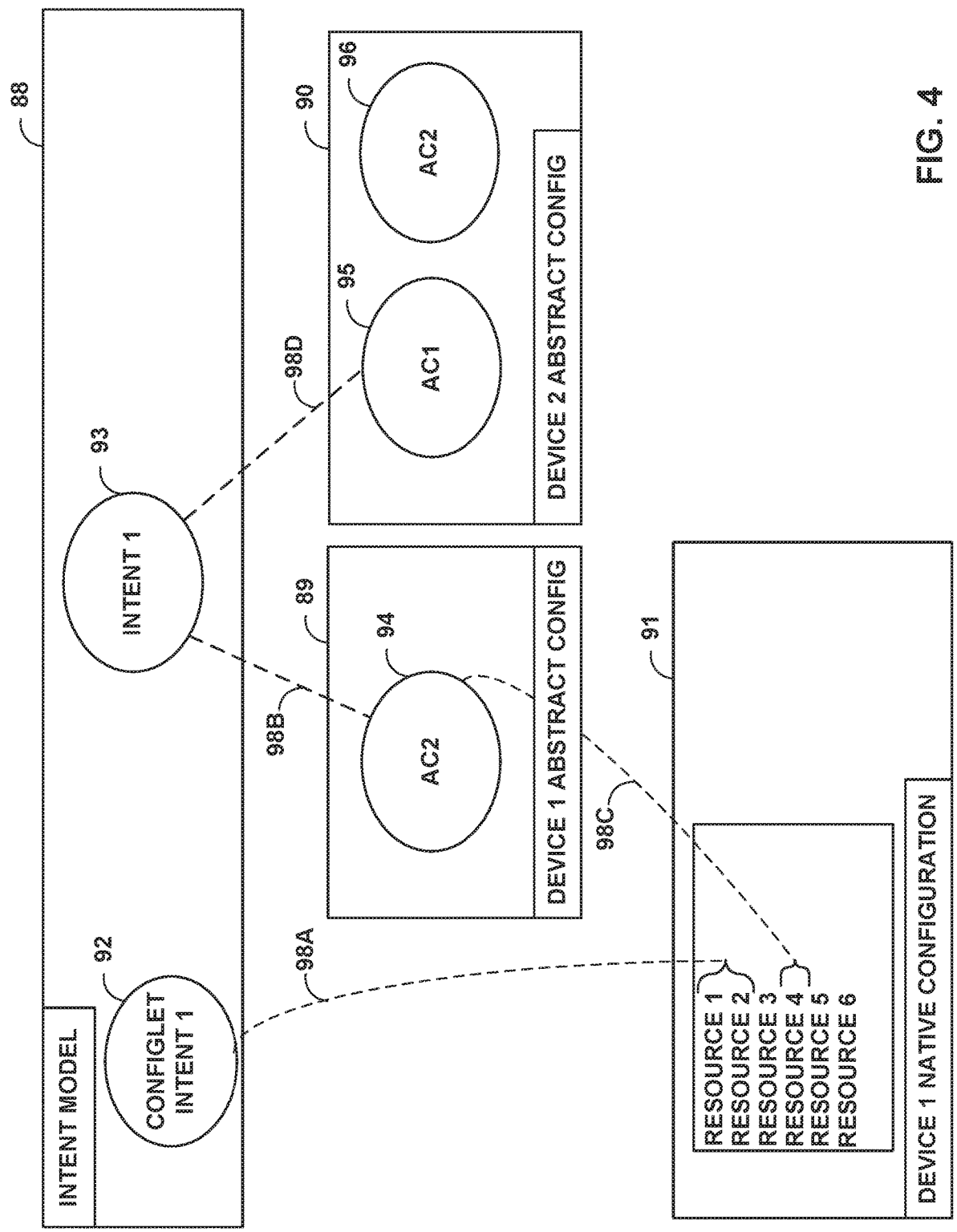
FIG. 4 is a conceptual diagram illustrating an example conflict detection between intents and configlets.

FIG. 4 is a conceptual diagram illustrating an example conflict detection between intents and configlets. In the example of FIG. 4, controller device 10 may be configured to determine an in-band conflict and an out-of-band conflict. In an in-band conflict an element configlet may configure the Command-Line Interface (CLI), which may be configured by the intents, which may conflict with intents.

In Out-Of-Band (OOB) conflicts, there may be OOB changes that can conflict with the configlet configuration and/or intent configurations. Accordingly, in some examples, controller device 10 may be configured to apply a compilation that maintains pointers 98A, 98B, 98C, 98D

(collectively, pointers 98) (e.g., dependencies) as shown in FIG. 4. For example, controller device 10 may apply a set of configuration changes to an owned resource of the set of owned resources and modify a low level configuration to include a pointer indicating the owner for the owned resource. For instance, pointer 98A may indicate an owner for resources 1 and 2 is first configlet intent 92 of intent data model 88 and pointer 98C may indicate an owner for resource 4 is abstract configuration 94 of abstract configuration model 89 for a first device. In this example, pointer 98B indicates that intent 93 of intent data model 88 is an owner of abstract configuration 94 and pointer 98D indicates that intent 93 is an owner of abstract configuration 95 and abstract configuration 96 of abstract configuration model 90 for a second device.

That is, for example, controller device 10 may be configured to apply a set of configuration changes to an owned resource (e.g., resource 4) based on intent 93 and modify a low-level (e.g., native) configuration for a network device to include pointers 98B, 98C indicating the owner for the owned resource to point to a representation of intent 93. Similarly, controller device 10 may apply a set of configuration changes to an owned resource of the set of owned resources based on a previously applied configlet and modify a low level configuration to include a pointer indicating the owner for the owned resource to point to a representation of the previously applied configlet.

In the example of FIG. 4, controller device 10 may be configured to determine, using pointers 98, which intents are creating objects when applying an abstract configuration resource configuration. Similarly, controller device 10 may be configured to determine which resources (e.g., configuration knobs) are generated by intent 93 and/or configlet 92 and/or abstract configurations 94-96 when applying device 1 native configuration model 91 for the first device.

Controller device 10 may be configured to determine the set of configuration changes does not conflict with the set of owned resources in response to determining the low level configuration does not include the pointer indicating the owner for the resource is not the configlet and apply the set of configuration changes to the resource in response to determining the set of configuration changes does not conflict with the set of owned resources. For example, if configlet intent 92 tries to override abstract configuration 94 (e.g., by configuring resource 4), controller device 10 may output an indication that a failure has occurred and would refrain from applying configlet intent 92. Example pseudo code illustrating a native configuration with pointers is as follows.

```
{
  "security": {
    "zone": {
      "security-zone":
      {
        "meta-data": [{"src_uuid":"1234","src _ type":
        "Firewall Intent"}],
        "name": "trust",
        "description": "The trust zone",
        "address-book": {
          "address": {
            "name": "eng",
            "description": "Address for Engineering Department",
            "ip-prefix": "1.1.1.1"
          }
        }
      }
    }
  }
}
```

-continued

```
    }
  }
```

In the foregoing pseudo code for anative configuration with pointers, meta-data may represent the pointer, "src_uuid":"1234" may represent an example identifier "1234" for the pointer, and "src_type":"Firewall" may represent an example intent "Firewall Intent" for a zone named "trust", which may bean example of a resource.

If the configlet generates the delta as below:

```
{
  "security": {
    "zone": {
      "security-zone": {
        "name": {
          "@operation":"delete"
          "value:"trust"
        }
      }
    }
  }
}
```

In the foregoing pseudo code for changes by a configlet, the instructions would request controller device 10 to delete the zone named "trust", which, if applied, would result in a potential conflict with the firewall intent.

Example pseudo code illustrating an example conflict detection algorithm is as follows.
Procedure: detectConflict(input_delta,config)
  Input_delta: delta generated by configlet change or
    Intent change
  For every config element in the Input delta
    Get the element in config
    Check if the element or parent resource have the Meta data
    If meta data present
      Identify if the config is owned by some other Intent/configlet
      If yes, mark it as failed return In the foregoing pseudo code for conflict detection, controller device 10 may determine configuration changes (e.g., "input_delta") generated by a configlet. In this example, controller device 10 may determine a native configuration (e.g., element in config) for each resource changed by the configuration changes and check if the native configuration has a pointer (e.g., "meta-data": [{"src_uuid":"1234", "src_type": "Firewall Intent"}). In this example, if the pointer is present, controller device 10 may identify whether the pointer specifies that the resource is owned by another configlet or intent-based configuration (e.g., by some other Intent/configlet). If the pointer specifies that the resource is owned by another configlet or intent-based configuration (e.g., "if yes"), controller device 10 may mark the configlet (e.g., the configlet that generates the delta) as failed and return. However, if the pointer specifies that the resource is not owned by another configlet or intent-based configuration (e.g., does not include "meta-data":[{"src_uuid":"1234", "src_type":"Firewall Intent" or the meta-data specifies the owner as the configlet), controller device 10 may skip portion of the above pseudo code (e.g., mark it as failed return) and apply the configuration changes (e.g., "input_delta") generated by the configlet.

In this way, controller device 10 may be configured to apply conflict detection to avoid conflicts between configlets and intents. For example, controller device 10 may be configured to use a low level configuration that maintains reference information to the intents and/or configlets. For instance, controller device 10 may be configured to generate a low level configuration that includes, for each respective owned resource, a pointer (e.g., pointers 98," "meta-data": [{"src_uuid":"1234","src_type":"Firewall Intent"", etc.) indicating an owner for the respective owned resources. When a configlet is being applied on a network device, controller device 10 may validate whether the configlet configuration is impacting the intent generated configuration.

For example, controller device 10 may be configured to determine a set of configuration changes to a resource does not conflict with a set of owned resources in response to determining the low level configuration does not include a pointer (e.g., "meta-data":[{"src_uuid":"1234","src_type": "Firewall Intent") indicating the owner for the resource is not the configlet and may apply the set of configuration changes to the resource in response to determining the set of configuration changes does not conflict. For instance, controller device 10 may determine the set of configuration changes does not conflict with the set of owned resources in response to determining that the low level configuration does not include any pointer for the resource. In another instance, controller device may determine the set of configuration changes specified by a particular configlet does not conflict in response to determining that the low level configuration includes a pointer for the resource indicating the resources is owned by the particular configlet.

However, controller device 10 may be configured to determine a set of configuration changes to a resource conflicts with a set of owned resources in response to determining the low level configuration include a pointer (e.g., "meta-data": [{"src_uuid":"1234","src_type":"Firewall Intent") indicating the owner for the resource is not the configlet and may refrain from apply the set of configuration changes to the resource in response to determining the set of configuration changes conflicts. For instance, controller device 10 may determine the set of configuration changes conflict with the set of owned resources in response to determining that the low level configuration includes a pointer for the resource indicating the resources is owned by an intent-generated configuration or another configlet.

Figure 5:
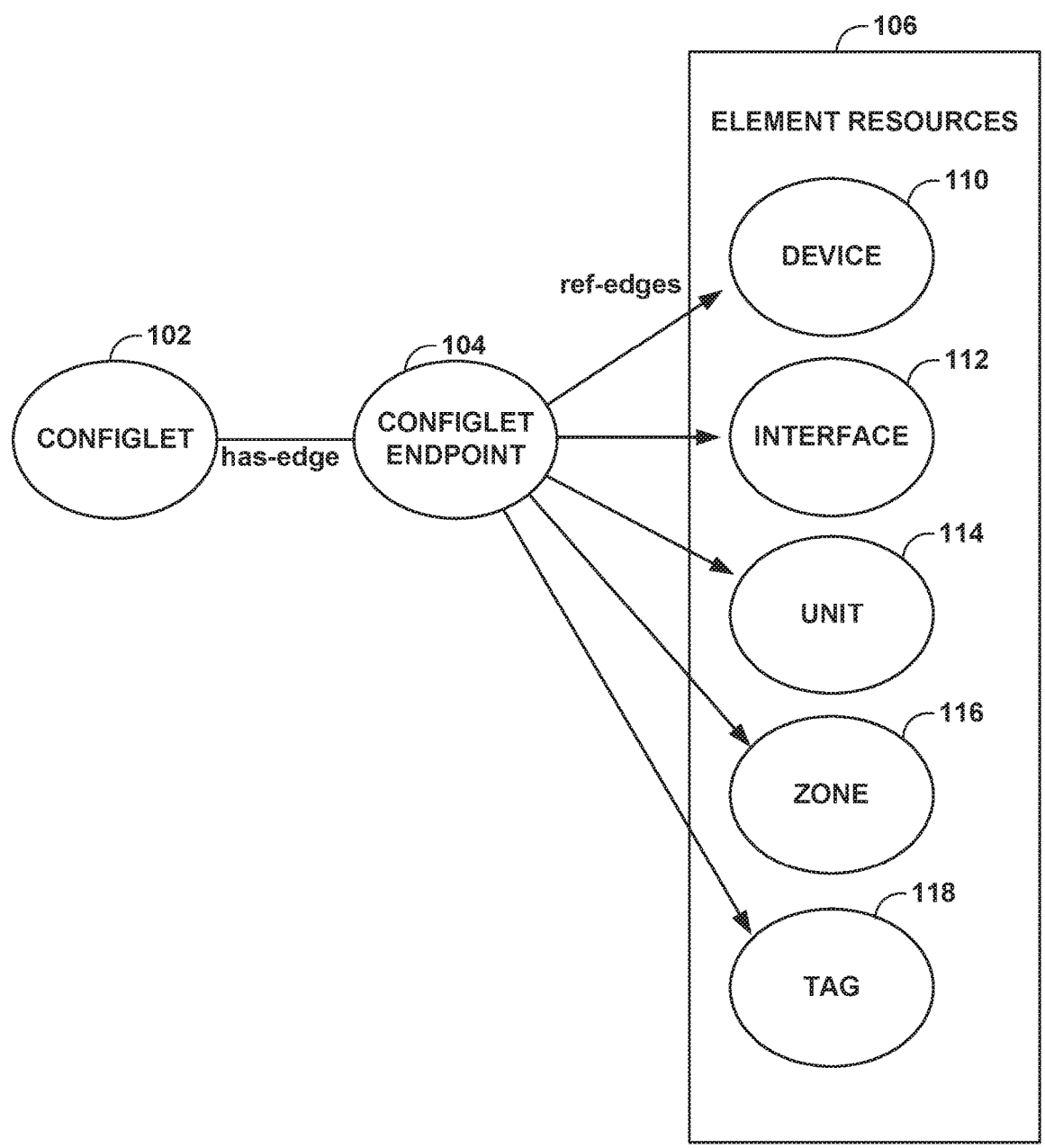
FIG. 5 is a conceptual diagram illustrating an example configlet and configlet endpoint as a graph.

FIG. 5 is a conceptual diagram illustrating an example configlet 102 and configlet endpoint 104 as a graph. As shown, a vertex for configlet 102 to configlet endpoint 104 uses a has-edge, which indicates configlet 102 has configlet endpoint 104. A vertex for configlet endpoint 104 to reference element resources 106 (also referred to herein as simply "resources 106") has ref-edges, which indicates configlet endpoint 104 references resources 106.

Configlet 102 may be defined in YANG. An example YANG extension that defines a 'Configlet definition' for configlet 102 may include "ext:configlet". All properties in the list and container may be properties of the configlet definition.

An example YANG extension that defines a 'configlet endpoint definition' for configlet endpoint 104 may include "ext:configlet-endpoint." All properties in the list and container may be the properties of the configlet endpoint definition. The configlet endpoint definition' may include a "resource-ref" field that specifies the "element resource reference" to the endpoint. In some examples, the configlet endpoint definition' may include a 'max-elements' field that specifies the maximum number of endpoints that can be associated to the resource. In some examples, allowed values for the a 'max-elements' field may be integer.

Example pseudo-code for the example configlet definition and configlet endpoint definition are as follows.

```
module qos {
    name:space "http://yang.juniper.net/qos-configlet";
    prefix "qos";
    list qos {
        ext:configlet {
            name '/name'
        }
        key "name";
        leaf name {
            type string;
            mandatory true;
            description "Name of the service";
        }
        list device-parameters{
            ext:configlet-
                endpoint {
                name
                '/name'
                resource-
                ref
                '/device'
                max-
                elements
                :1
                }
                key "name";
                leaf name {
                    type string;
                    mandatory true;
                    description "Name of the service";
                }
        }
    }
}
```

For example, configlet 102 include a name (e.g., "name") and a description for configlet 102 (e.g., "Name of the service"). As shown, configlet 102 may specify configlet endpoint 104 that includes a name (e.g., "name"), a description for configlet endpoint 104 (e.g., "Name of the service"), and reference element resources 106 (also referred to herein as simply "resource"). Reference element resource 106 may refer to a device resource or any configuration resource within a device.

Resource 106 may be any configuration resource within a device, such, as for example, but not limited to, a Virtual Routing and Forwarding (VRF) instance, Border Gateway Protocol (BGP) instance, or Open Shortest Path First (OSPF) instance, or any configuration object on a device. As shown, resources 106 may include, for example, but not limited to, device 110, interface 112, unit 114, zone 116, and/or tag 118. Device 110 may refer to one of elements 14. Interface 112 may refer to a software interface of controller device 10 to elements 14. Unit 114 may refer to a logical interface, such as, but not limited to, for example, control unit 22. Zone 116 may refer to a security zone is a collection of one or more network segments requiring the regulation of inbound and outbound traffic through policies. Tag 118 may refer to a tag data model that includes a resource selector to identify the child resources within device. Example properties of a configlet and a configlet endpoint are presented in Table 1.

TABLE 1

| Configlet | leaf:Name |
| --- | --- |
| | type: String |
| | leaf: Type |
| | type: String |
| | leaf: properties |
| | type: blob |
| Configlet endpoint | Leaf: resource |
| | type: Element resource reference |

Table 2 shows example mapping from input to a configlet graph database model.

TABLE 2

| Input | Configlet/configlet endpoint |
| --- | --- |
| ext:Configlet | Configlet vertex |
| Module | Configlet type |
| Configlet extension name value | Name |
| Model Definition properties | Properties blob |
| ext: Configlet endpoint | Configlet endpoint vertex |
| Container/list with Configlet-endpoint extension | Configlet endpoint type |
| Configlet endpoint extension name value | Name |
| Model Definition properties | Properties blob |

Figure 7:
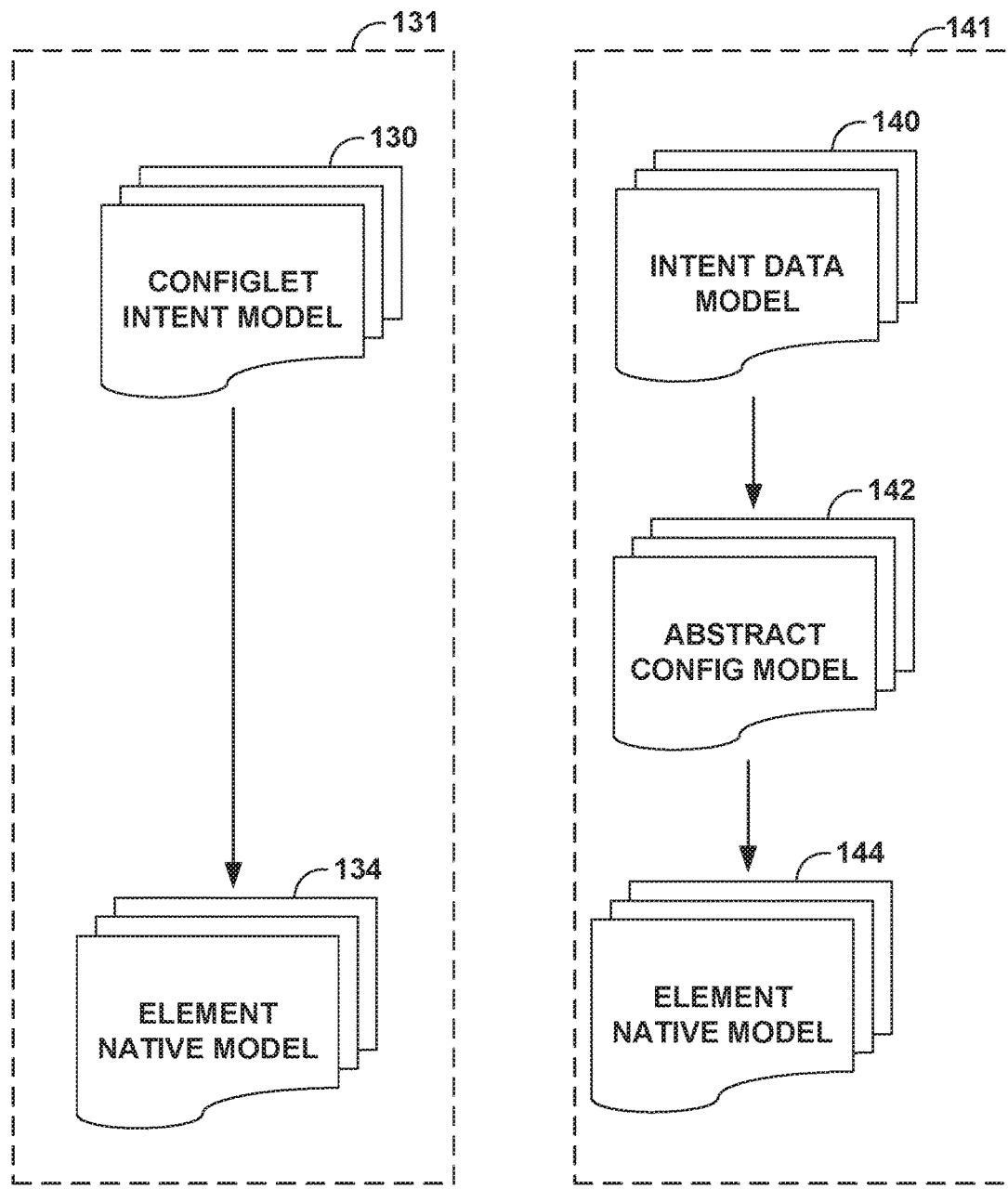
FIG. 7 is a conceptual diagram illustrating an example data transformation.

In accordance with techniques described herein, resources 106 may be part of a configlet intent model (e.g., see FIG. 7, configlet intent model 130) and a native configuration may be part of an element native model (e.g., see FIG. 7, element native model 134). As such, when configlet 102 is associated to configlet endpoint 104, configlet endpoint 104 may have reference to element resources 106. In this way, techniques permit a controller device 10 to validate, if there is any other configlet instance of a same type that is already associated with any of element resources 106. If the max-elements is 1, controller device 10 may allow only one configlet instance of a same type to be associated to a single resource.

Figure 6:
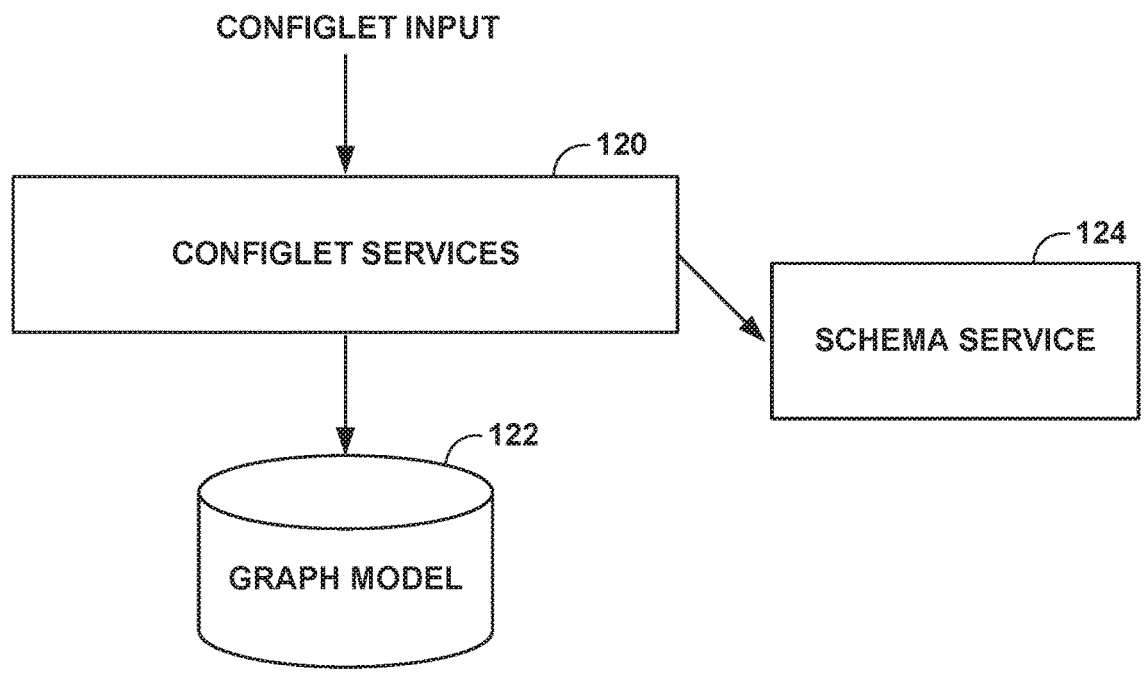
FIG. 6 is a conceptual diagram illustrating an example configlet system.

FIG. 6 is a conceptual diagram illustrating an example configlet system. Intents may be modeled as a graph in graph model 122, which may be an example of an "opaque intent graph model" for configlets. Configlet 102 may be modeled by configlet services 120 as opaque intents in an intent server. An opaque intent data model graph may refer to a data structure that can transparently represent any model in intent graph format. There may be two opaque vertices with one to many associations, a configlet (e.g., configlet 102) and a configlet endpoint (e.g., configlet endpoint 104). Controller device 10 may be configured to apply schema service 124 to validate configlet properties of configlet 102 and configlet endpoint 104. In this way, controller device 10 may be configured to automatically generate an intent graph model from configlet definitions. For example, controller device 10 may validate the configlets based on definition provided by configlet 102 and/or configlet endpoint 104. The validation may include a schema validation based on the opaque intent graph model and/or an endpoint association validation. As used herein, an opaque intent may refer to storing opaque vertices in an intent model that are used to model a configlet and configlet endpoint. The endpoint association validation may verify that a configlet instance does not override another configlet of the same type.

Controller device 10 may be configured to perform data validation as specified by the following pseudo code.
Build Configlet and configlet-endpoint objects from Input.
Validate Configlet properties with schema service
For every configlet endpoint
    Validate Configlet endpoint properties with schema service
    Fetch resource ref max-elements
    if the resource ref max-element is 1
        Fetch the resource "referer objects" of "Configlet Type" from intent DB.
        if the referrer exists, Mark as Failed For example, controller device 10 may build configlet 102 and configlet endpoint 104 from an input (e.g., from administrators 12). In this example, controller device 10 performs schema service 124 to validate configlet properties of configlet 102 and configlet endpoint 104. For example, controller device 10 may be configured to fetch resources 106. In this example, controller device 10 may be configured to validate if there is any other configlet instance of a same type that is already associated with any of element resources 106. If the max-elements is 1, controller device 10 may allow only one configlet instance of a same type to be associated to a single resource. For instance, controller device 10 may determine that a resource is not associated with another configlet comprising a type corresponding to a type of a configlet. In this instance, in response to determining that the resource is not associated with another configlet comprising the type corresponding to the type of the configlet, controller device 10 may be configured to apply a set of configuration changes specified by the configlet to the resource.

FIG. 7 is a conceptual diagram illustrating an example data transformation. Configlet intent data model 130, element native model 134, intent data model 140, abstract configuration model 142, and element native model 144 may be stored in configuration database 40 or another database of controller device 10. Configlet intent data model 130 and intent data model 140 may represent an example of intent data model 88 of FIG. 4. For example, configlet intent data model 130 may represent an example of first configlet intent 92 and intent data model 140 may represent an example of intent 93. Abstract configuration model 142 may represent an example of abstract configuration model 89 and/or abstract configuration model 90 of FIG. 4. For example, abstract configuration model 142 may be an example of abstract configuration 94. Element native model 134 and element native model 144 may represent an example of native configuration model 91 of FIG. 4. For example, element native model 134 may include configuration changes to a first set of resources of a device and element native model 144 may include configuration changes to a second set of resources of the device.

In the example of FIG. 7, configlet intent data model 130 and intent data model 140 may be stateless intents. Stateless intents may be fully declarative ways of describing an intended network/compute/storage state, without concern for a current network state. Stateless intents may include, for example, a Virtual Private Network (VPN) connection between two devices. Application workflows may translate business intents into stateless intents. An abstract configuration model may refer to a common low level model for a device. Element native model 134 and element native model 144 may include one or more instructions in a native language of a device (e.g., elements 14) being configured.

In the example of FIG. 7, controller device 10 may receive an indication of a stateful intent. For instance, controller device 10 may receive intent data model 140. In this example, controller device 10 may determine a stateful intent. For instance, controller device 10 may determine abstract configuration model 142. In this example, controller device 10 may compile, the stateless intent into an abstracted configuration model. For instance, controller device 10 may compile abstract configuration model 142 into element native model 144 based on a device model of the network device being configured. In contrast, controller device 10 may directly translate configlet intent data model 130 to element native model 134 based on a device model of the network device being configured.

As illustrated in FIG. 7, configuration changes from intent-generated process 141 and configuration changes from configlet process 131 may be independent. That is, controller device 10 may be configured to translate configlet intent data model 130 to element native model 134 without determining potential conflicts from configuration changes from translating intent data model 140 to element native model 144. As such, administrators 12 may input a request for controller device 10 to apply a configlet that translates into element native model 134 for applying a set of low-level configuration changes to elements 14 that conflict with low-level configuration changes from applying element native model 144. In such instances, applying element native model 134 to elements 14 may result in controller device 10 failing to satisfy the stateless intent of intent data model 140. For instance, when administrators 12 request a particular bandwidth between element 14A and element 14D, controller device 10 may fail to provide the particular bandwidth after applying element native model 134 to elements 14.

Techniques described herein may maintain the independence of intent-generated process 131 and configlet process 141 while automatically performing validations to help to ensure that there are no conflicts between different configlets and between configlets and intent-generated configurations. For example, element native model 144 may specify a pointer indicating intent data model 140 is an owner for each resource being modified by element native model 144. As such, the resource may reference the pointer indicating intent data model 140 is the owner when controller device 10 applies element native model 144 to a resource. For instance, controller device 10 may generate a native configuration for the resource that includes a pointer (e.g., pointers 98," "meta-data": [{"src_uuid":"1234","src_type": "Firewall Intent""", etc.) indicating intent data model 140 is an owner of the resource. In this way, when controller device 10 determines that element native model 134 would change the resource referencing the pointer to intent data model 140, controller device 10 may determine the set of configuration changes to be applied for element native model 134 conflict with intent data model 140, even though intent-generated process 131 is opaque to configlet process 141.

Similarly, element native model 134 may specify a pointer indicating configlet intent model 130 is an owner for each resource being modified by element native model 134. In this example, the resource may reference the pointer indicating configlet intent model 130 is an owner when controller device 10 applies element native model 134 to a resource. In this way, when controller device 10 determines that element native model 144 would change the resource referencing the pointer to intent data model 130, controller device 10 may determine the set of configuration changes to be applied for element native model 144 conflict with configlet intent model 130, even though configlet process 141 is opaque to intent-generated process 131.

Figure 8:
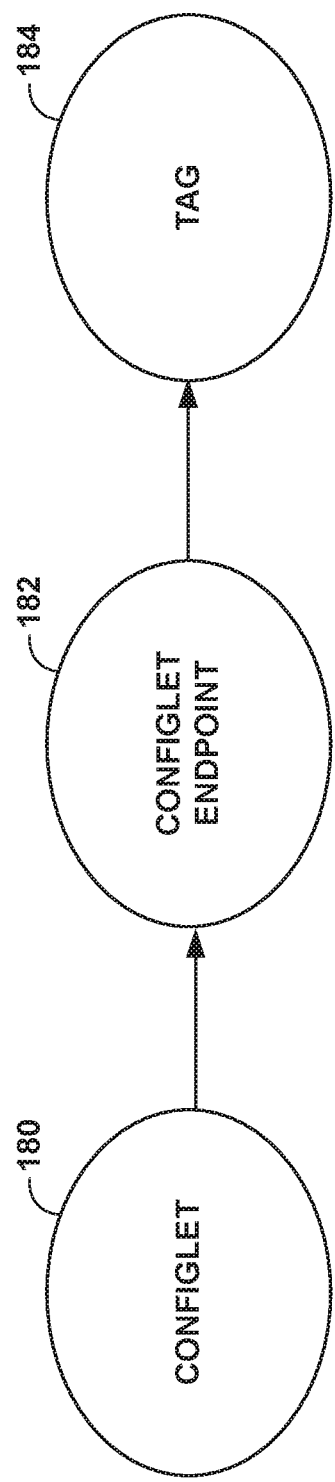
FIG. 8 is a conceptual diagram illustrating an example bulk association through tags.

FIG. 8 is a conceptual diagram illustrating an example bulk association through tags. In the example of FIG. 8, configlet 180 is associated with configlet endpoint 182. In some examples, controller device 10 may be configured to apply bulk association. For example, controller device 10 may be configured to allow a configlet to apply tag 184 on resources for bulk association. A tag may refer to a tag data model that includes a resource selector to identify child resources. For example, a tag data model may include a resource selector identifying the phrase "Core" in a device filed. In this way, all Border Gateway Protocols (BGPs) starting with a name "Core" in the device field may be associated.

In some examples, controller device 10 may be configured to apply an annotate (e.g., comment) feature to support tag 184 for the device managed resources. For example, the annotate feature may be used to add any comments to a configuration path as shown in the following example configuration.

```
routing-options {
  rib-groups {
    ifrg {
      import-rib[inet.0 inet.2];
      /*core*/
    }
  }
}
```

In the foregoing configuration, "*core*" may represent a resource selector. In this way, tag 184 may provide a tag definition may include the resource selector that specifies a child resource selection from a configuration. For example, a tag data model of tag 184 may tag all BGPs starting with a name in "core" devices. A tag definition may include the resource selector, which may specify the child resource selection from configuration.

Controller device 10 may use a data model that can be YANG or JavaScript Object Notation (JSON). An example tag definition follows.

```
module Tag{
    namespace "http://yang.juniper.net/qos-configlet";
    prefix "qos";
    list tag{
        key "name";
        leaf name {
            type string;
            mandatory true;
            description "Name of the Tag";
        },
        leaf resourceselector {
            type string;
            description "resource description ";
        },
    }
```

In the foregoing tag instance, "resourceselector" may represent a function that allows a selection of the child resources within the resource. For "Core" tag instance, the resource selection in the tag may be: "/configuration/protocols/mpls/lsp-external-controller[name=northstar*" This tag may cause controller device 10 to select all the lsp-external-controllers that are starting with "northstar".

In response to adding a configlet to a tag, controller device 10 may be configured to fetch all resources and associate to configlet 180. In response to dynamically updating tag 184, controller device 10 may be configured to add and/or update the association accordingly. For example, when configlet 180 is added and/or updated through intents and/or automation scripts, an Element Management System (EMS) (e.g., controller device 10) detects the configuration changes. In this example, the EMS checks if the resource matches with any tag. In this example, the EMS creates and/or updates configlet associations. That is, controller device 10 may determine a set of resources that each include a respective tag specifying a particular group of resources and apply the set of configuration changes to each resource of the set of resources.

Figure 9:
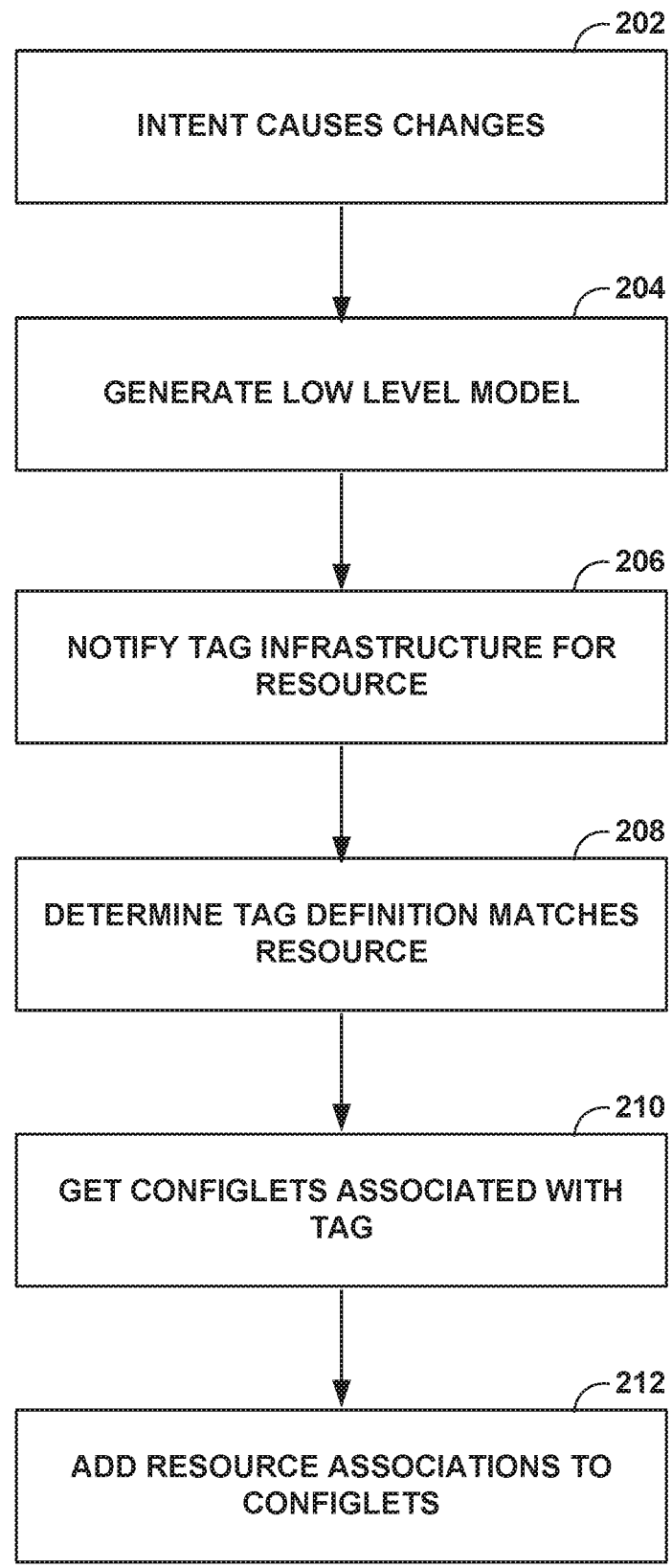
FIG. 9 is a conceptual diagram illustrating intent augmentation.

FIG. 9 is a conceptual diagram illustrating intent augmentation. A tag data model may include a resource selector to identify child resources. For example, controller device 10 may translate intents to abstract configurations. Controller device 10 may augment this configuration with additional configurations. For example, controller device 10 may create an abstract configuration with a name convention (e.g., tag).

Controller device 10 may determine an intent causes changes to a configuration for element 14A (202). For instance, controller device 10 may receive an intent-generated configuration and determine the intent-generated configuration causes changes to a configuration for element 14A. Controller device 10 may generate a low level model (e.g., a native configuration) (204). For instance, controller device 10 may generate the low level model from an abstract configuration model, which is generated by controller device 10 using an intent data model.

Controller device 10 may notify a tag infrastructure for a resource (206) and determine a tag definition matches the resource (208). For example, controller device 10 may create an abstract configuration with a name and create a tag for the devices and resource selector with matching criteria. Controller device 10 may determine one or more configlets associated with the tag (210) and add resource associations to the configlets (212). For example, controller device 10 may detect the resources added and add and/or update a tag association for the new resources. In this way, controller device 10 may be configured to apply bulk association to multiple resources.

In accordance with techniques described herein, controller device 10 may be configured to support a programmatic way to model configlets in a network. Controller device 10 may also be configured to perform model validations. Controller device 10 may be configured to assign configlets on any resource. Examples of resources may include, for example, a device, a port, a zone, a vlan, a routing instance, a configuration resource object, or another resource. The resources can be controller managed or unmanaged. For example, controller device 10 may manage the resources or the resources can be any path in configuration, which is directly present on device.

In some examples, controller device 10 may be configured to support configlets along with intents. For example, controller device 10 may be configured to prevent a configlet from overriding an intent generated configuration. In some examples, controller device 10 may be configured to detect conflicts across configlets, intents, and/or OOB changes. In some examples, controller device 10 may be configured to augment the configuration through configlets. In some examples, controller device 10 may be configured to associate configlets using a tag of resources. In some examples, controller device 10 may be configured to modify the resources in controller device 10 or the resources can be directly fetched from a device database on demand. Controller device 10 may be configured to tag the resources on devices.

Figure 10:
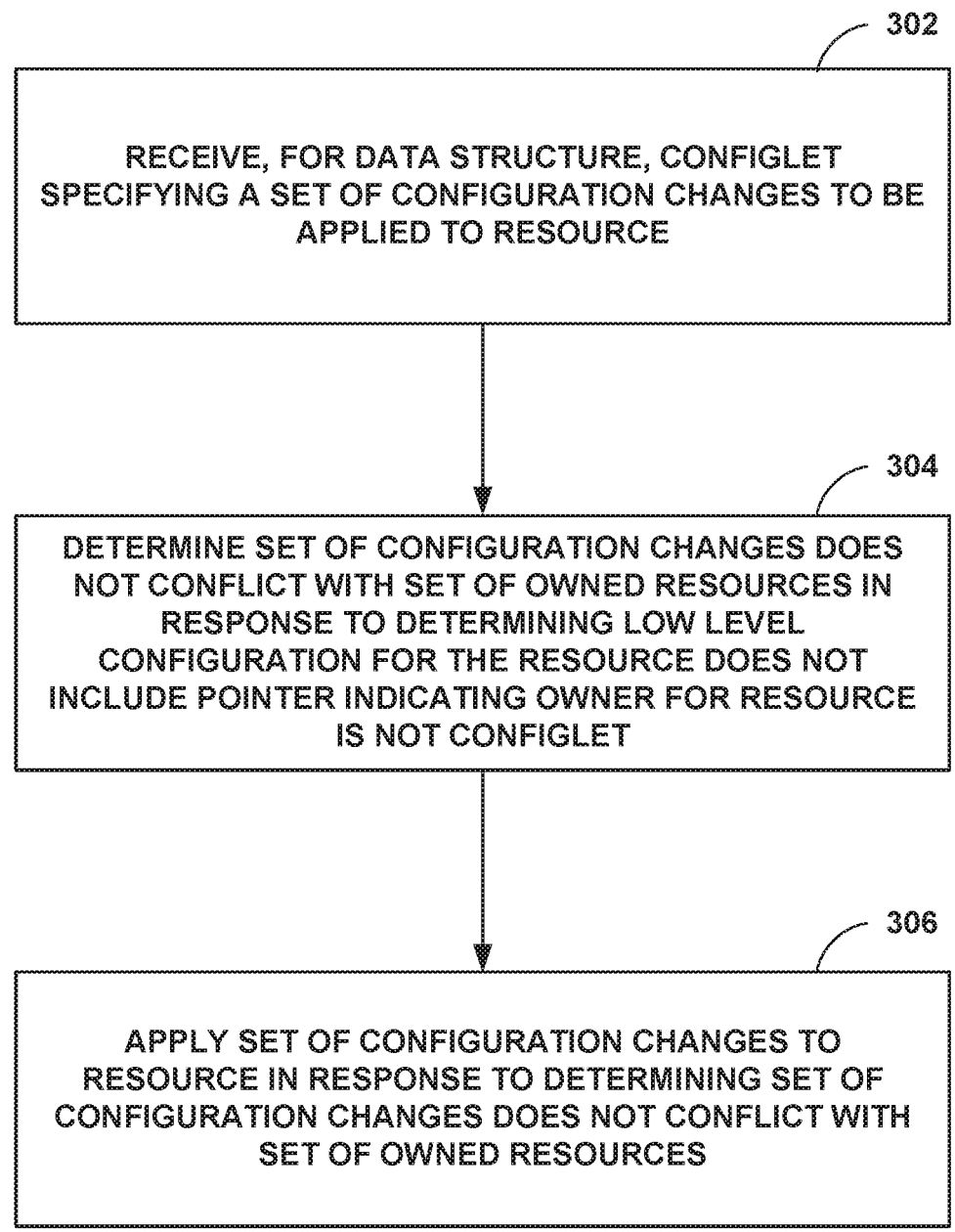
FIG. 10 is a flow chart illustrating an example process for managing network devices using a combination of configlets and intents.

FIG. 10 is a flow chart illustrating an example process for managing network devices using a combination of configlets and intents. Controller device 10 may receive, for a data structure, a configlet specifying a set of configuration changes to be applied to a resource of a plurality of resources of the plurality of network devices (302). The data structure may include a plurality of nodes and a plurality of edges, each node of the plurality of nodes being representative of a respective network device of the plurality of network devices and the plurality of edges defining relationships between the plurality of nodes. A low level configuration for each respective owned resource of a set of owned resources of the plurality of resources may include a pointer indicating an owner for the respective owned resources. Controller device 10 may determine the set of configuration changes does not conflict with the set of owned resources in response to determining the low level configuration for the resource does not include a pointer indicating the owner for the resource is not the configlet (304). Controller device 10 may apply the set of configuration changes to the resource in response to determining the set of configuration changes does not conflict with the set of owned resources (306).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:
1. A method comprising:
receiving, by a controller device that manages a plurality of network devices and for a data structure, a configlet specifying a set of configuration changes to be applied to a resource of a plurality of resources of the plurality of network devices, the data structure comprising a plurality of nodes and a plurality of edges, each node of the plurality of nodes being representative of a respective network device of the plurality of network devices and the plurality of edges defining relationships between the plurality of nodes, wherein a low level configuration for each respective owned resource of a set of owned resources of the plurality of resources includes a pointer indicating an owner for the respective owned resources;

determining, by the controller device, the set of configuration changes to be applied to the resource does not conflict with the set of owned resources when the low level configuration for the resource does not include a pointer indicating the owner for the resource is not the configlet, wherein the set of owned resources comprises one or more resources that are controlled by one or more intent-generated configurations and/or one or more previously applied configlets different from the configlet and wherein the low level configuration comprises device-level configuration data; and applying, by the controller device, the set of configuration changes to the resource in response to determining the set of configuration changes does not conflict with the set of owned resources.

2. The method of claim 1, wherein determining the set of configuration changes does not conflict with the set of owned resources comprises determining that the low level configuration for the resource does not include the pointer indicating the owner for the resource.

3. The method of claim 1, wherein determining the set of configuration changes does not conflict with the set of owned resources comprise determining that the low level configuration for the resource includes the pointer indicating the owner for the resource and the pointer indicates the owner is the configlet.

4. The method of claim 1, further comprising:
determining, by the controller device, the set of configuration changes conflicts with the set of owned resources in response to determining the low level configuration for the resource includes the pointer indicating the owner for the resource is not the configlet; and
refraining from applying, by the controller device, the set of configuration changes to the resource in response to determining the set of configuration changes conflicts with the set of owned resources.

5. The method of claim 1, further comprising:
applying, by the controller device, a set of configuration changes to an owned resource of the set of owned resources based on an intent-generated configuration of the one or more intent-generated configurations; and
modifying, by the controller device the data structure to include the pointer indicating the owner for the owned resource to point to the intent-generated configuration.

6. The method of claim 5, further comprising:
receiving, by the controller device, an indication of a stateful intent;
determining, by the controller device, a stateless intent for implementing the stateful intent; and
compiling, by the controller device, the stateless intent into the intent-generated configuration.

7. The method of claim 1, wherein the configlet is a first configlet, the method further comprising:
applying, by the controller device, a set of configuration changes to an owned resource of the set of owned resources based on a second configlet of the one or more previously applied configlets; and modifying, by the controller device the data structure to include the pointer indicating the owner for the owned resource to point to the second configlet.

8. The method of claim 1, wherein the data structure indicates that the resource includes a tag data model including a resource selector specifying a particular group of resources, the method further comprises:
determining, by the controller device, a set of resources of the plurality of resources that each include a respective tag specifying the particular group of resources; and
applying, by the controller device, the set of configuration changes to each resource of the set of resources.

9. The method of claim 1, further comprising:
determining, by the controller device, a set of configuration changes to be applied to an owned resource of the set of owned resources based on an intent-generated configuration of the one or more intent-generated configurations, the owned resource including a tag specifying a particular group of resources;
determining, by the controller device, one or more owned resources of the set of owned resources that include a tag specifying the particular group of resources; and
applying, by the controller device, the set of configuration changes to each owned resource of the one or more owned resources.

10. The method of claim 1, wherein the resource comprises a device, a port, a zone, a virtual local area network, a routing instance, or configuration resource object.

11. The method of claim 1, wherein the configlet comprises a configlet graph database model specifying a configlet vertex and a configlet endpoint vertex.

12. The method of claim 1, wherein the configlet is associated with a configlet endpoint and wherein the configlet endpoint comprises a reference to the resource, and wherein applying the set of configuration changes to the resource is in response to determining that the resource is not associated with another configlet comprising a type corresponding to a type of the configlet.

13. The method of claim 1, further comprising:
validating, by the controller device, the configlet; and
augmenting, by the controller device, a configuration of the resource with one or more additional configurations.

14. A controller device that manages a plurality of network devices, the controller device comprising one or more processing units implemented in circuitry and configured to:
receive, for a data structure, a configlet specifying a set of configuration changes to be applied to a resource of a plurality of resources of the plurality of network devices, the data structure comprising a plurality of nodes and a plurality of edges, each node of the plurality of nodes being representative of a respective network device of the plurality of network devices and the plurality of edges defining relationships between the plurality of nodes, wherein a low level configuration for each respective owned resource of a set of owned resources of the plurality of resources includes a pointer indicating an owner for the respective owned resources;
determine the set of configuration changes does not conflict with the set of owned resources when the low level configuration for the resource does not include a pointer indicating the owner for the resource is not the configlet, wherein the set of owned resources comprises one or more resources that are controlled by one or more intent-generated configurations and/or one or more previously applied configlets different from the configlet and wherein the low level configuration comprises device-level configuration data; and apply the set of configuration changes to the resource in response to determining the set of configuration changes does not conflict with the set of owned resources.

15. The controller device of claim 14, wherein, to determine the set of configuration changes does not conflict with the set of owned resources, the one or more processing units are configured to determine that the low level configuration for the resource does not include the pointer indicating the owner for the resource.

16. The controller device of claim 14, wherein, to determine the set of configuration changes does not conflict with the set of owned resources, the one or more processing units are configured to determine that the low level configuration for the resource includes the pointer indicating the owner for the resource and the pointer indicates the owner is the configlet.

17. The controller device of claim 14, wherein the one or more processing units are configured to:
   determine the set of configuration changes conflicts with the set of owned resources in response to determining the low level configuration for the resource includes the pointer indicating the owner for the resource is not the configlet; and
   refrain from applying the set of configuration changes to the resource in response to determining the set of configuration changes conflicts with the set of owned resources.

18. The controller device of claim 14, wherein the one or more processing units are configured to:
   apply a set of configuration changes to an owned resource of the set of owned resources based on an intent-generated configuration of the one or more intent-generated configurations; and
   modify the data structure to include the pointer indicating the owner for the owned resource to point to the intent-generated configuration.

19. The controller device of claim 18, wherein the one or more processing units are configured to:
   receive an indication of a stateful intent;
   determine a stateless intent for implementing the stateful intent; and
   compile the stateless intent into the intent-generated configuration.

20. A computer-readable storage medium having stored thereon instructions that, when executed, cause a processor of a controller device that manages a plurality of network devices to:
   receive, for a data structure, a configlet specifying a set of configuration changes to be applied to a resource of a plurality of resources of the plurality of network devices, the data structure comprising a plurality of nodes and a plurality of edges, each node of the plurality of nodes being representative of a respective network device of the plurality of network devices and the plurality of edges defining relationships between the plurality of nodes, wherein a low level configuration for each respective owned resource of a set of owned resources of the plurality of resources includes a pointer indicating an owner for the respective owned resources;
   determine the set of configuration changes does not conflict with the set of owned resources when the low level configuration for the resource does not include a pointer indicating the owner for the resource is not the configlet, wherein the set of owned resources comprises one or more resources that are controlled by one or more intent-generated configurations and/or one or more previously applied configlets different from the configlet and wherein the low level configuration comprises device-level configuration data; and
   apply the set of configuration changes to the resource in response to determining the set of configuration changes does not conflict with the set of owned resources.

* * * * *